Figure 1:
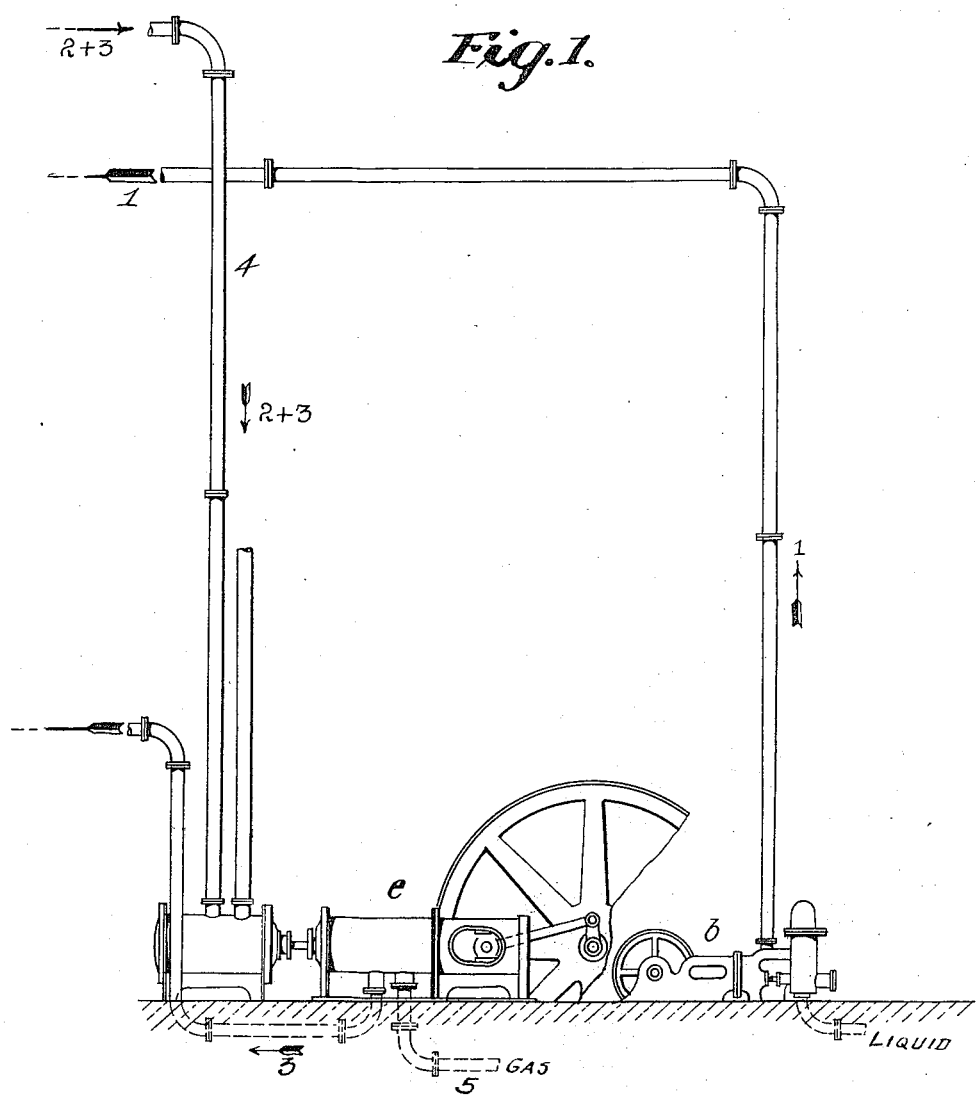

J. WEISE & F. RIECHE.
PROCESS AND APPARATUS FOR UTILIZING THE ENERGY OF WASTE GASES.
APPLICATION FILED APR. 8, 1909.

962,108.

Patented June 21, 1910.

2 SHEETS—SHEET 1.

UNITED STATES PATENT OFFICE.

JULIUS WEISE AND FRIEDRICH RIECHE, OF OESTRICH-ON-THE-RHINE, GERMANY, ASSIGNORS TO THE FIRM OF RUDOLPH KOEPP & CO., OF OESTRICH-ON-THE-RHINE, GERMANY.

PROCESS AND APPARATUS FOR UTILIZING THE ENERGY OF WASTE GASES.

962,108. Specification of Letters Patent. Patented June 21, 1910.

Application filed April 8, 1909. Serial No. 488,670.

*To all whom it may concern:*

Be it known that we, JULIUS WEISE and FRIEDRICH RIECHE, subjects of the German Emperor, and residents of Oestrich-on-the-Rhine, Germany, have invented certain new and useful Improvements in Processes and Apparatus for Utilizing the Energy of Waste Gases, of which the following is a specification.

Our invention relates to improvements in apparatus for utilizing waste gases and is particularly applicable to apparatus for continuously producing formiates by the method described in our prior U. S. Patents 820,159, 820,373, and 820,374, May 8, 1906. In this apparatus as in the process described in the above patents, carbon monoxid is absorbed by alkalies or alkaline earths, or their compounds, in solution or suspension under pressure and in a heated state, and in some cases at a temperature which is above the boiling point of the solution acted upon by the gas. As it is difficult, for economical reasons, to obtain the carbon monoxid in a pure state, it is generally necessary to use one of its numerous mixtures with other gases, such for example as blast furnace gas, water gas, producer gas, etc. However, when using a gas mixture of this kind, the inactive parts of the mixture also which are useless in the reaction must be compressed and heated with the carbon monoxid, causing an increase of the cost of the process, which is the more important, the smaller the proportion of the active gas in the mixture is.

The object of the present improvements is to avoid this disadvantage.

With this object in view, the invention is based on the fact that the energy which is imparted by the compressor to the inactive gases going through the process is not lost, but on the contrary is supplemented by the energy of the steam with which the said gases are necessarily saturated when being in contact with the hot liquids. The sum of the said energies is so much the greater the higher the temperature within the reaction receptacle is, and it can be put to use by causing the gas which has not been absorbed and which is saturated with steam to drive a machine connected for this purpose to the reaction receptacle. For example, the said machine can be used for driving the compressor by which the gases to be supplied to the apparatus are compressed. If the reaction receptacle is in connection with a steam boiler which is under the same pressure, the steam required for heating the gas and the liquid and for balancing the losses caused for example by friction is supplied to the reaction receptacle by said boiler, and in addition only so much steam as corresponds to the amount of absorbed carbon monoxid. Under these circumstances it is nearly immaterial, if the carbon monoxid contains large amounts of inactive gases, because the latter cause a corresponding increase of the energy available at the end of the reaction. The entire reaction takes place within the conduit supplying the steam to the working machine. The latter forms the closure for the apparatus and regulates the pressure. The steam escaping from the exhaust of the machine can be utilized in any preferred way.

For the purpose of explaining the invention more in detail an example of an apparatus embodying the same has been illustrated in the accompanying drawing, in which—

Figure 2:
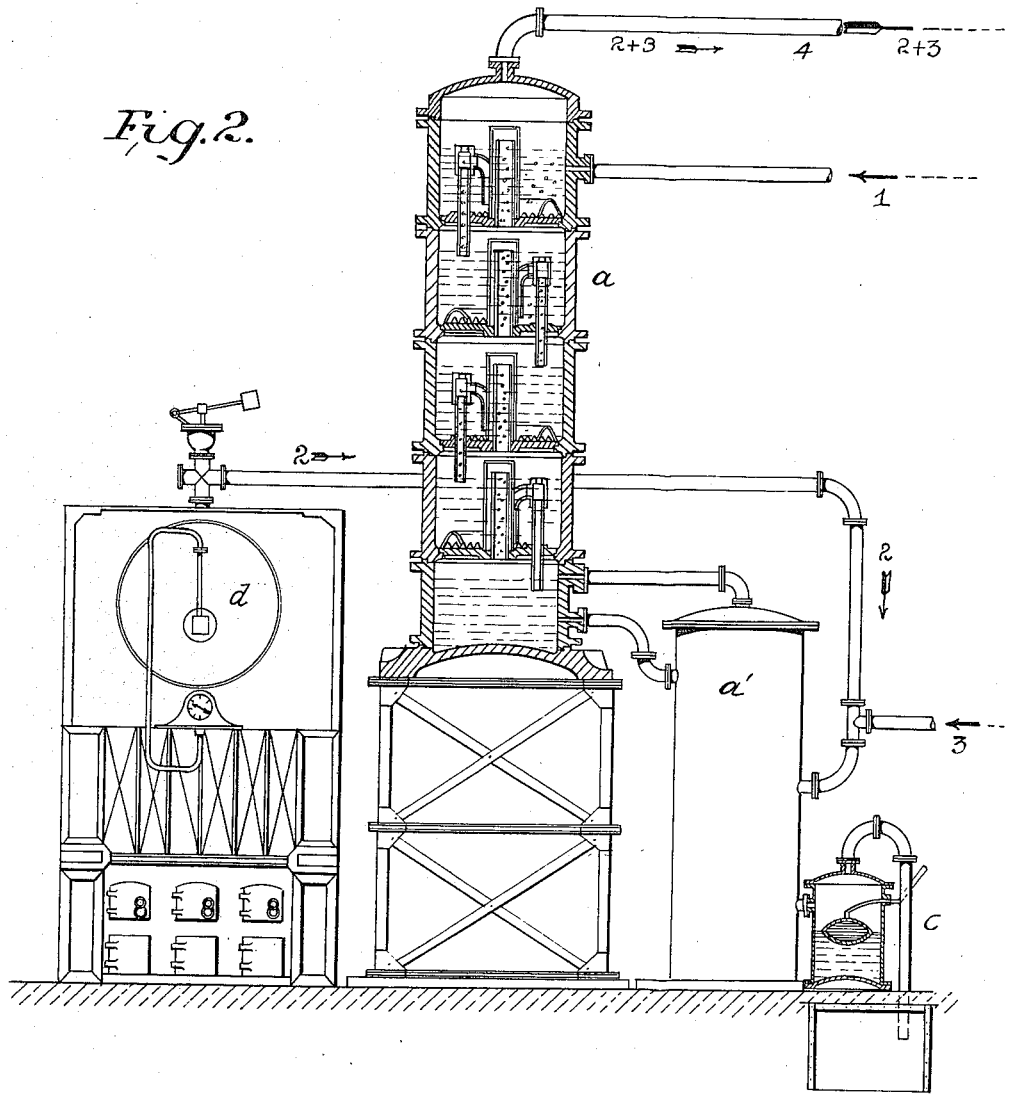

Figures 1 and 2 show a diagrammatical view of the apparatus.

By a pump *b* the lye or liquid flowing in the direction of the arrows 1 is pumped into the uppermost one of the reaction receptacles *a*. The liquid successively flows through the reaction receptacles and in each of the same it is brought in thorough contact with the gaseous mixture containing the carbon monoxid, such for instance as producer gas, whereupon it escapes from the receptacles through an automatic discharge *c* of well known construction.

The entire apparatus is heated by means of a steam boiler *d*. The steam flows in the direction of the arrows 2 and into the lowermost receptacle *a'*, which is similar in construction to *a*, moves upward in a direction opposite to that of the liquid, heats the latter, and flows into the steam cylinder of the working machine *e* which, in the example illustrated in the drawing, is a compressor of suitable size, the steam cylinder being of greater diameter than the compressor cylinder. Through a pipe 5 the compressor draws in the gaseous mixture required for the reaction and compresses the same to the pressure of the gases contained in the reaction receptacles. In the same way as the steam, the gas is forced in the direction of the arrows 3 and into the lowermost receptacle $a'$ and rises together with the steam in a direction opposite to that of the liquid. In each of the receptacles it is thoroughly mixed with the liquid, and the carbon monoxid is absorbed, while the inactive gas, which in case of producer gas is nitrogen, is saturated with steam according to the temperature.

The part of the gases which is not absorbed, after being saturated with steam, escapes from the uppermost receptacle through the conduit 4, as indicated by arrows 2 and 3, and it is now used for driving the compressor, thereby substituting the steam which at the beginning of the operation was used for this purpose. The reaction receptacles $a$, $a'$ may be of any well known construction as shown in the drawing, the main object being to thoroughly mix the gas and the liquid. The ranges in temperatures and pressures will depend upon the particular process. In the particular process described the temperatures will range from 175 to 185° centigrade, and the pressure from 12 to 18 atmospheres according to the percentage of carbon monoxid in the mixture of gases.

While in the foregoing we have described our invention with reference to a particular embodiment thereof, we wish it to be understood that we do not limit ourselves to the use of the improvement in the particular process described, but that the same may be used in other processes in which similar conditions are prevalent.

We claim:

1. In an apparatus for absorbing a gas from a mixture of gases by means of a liquid, the combination with the reaction receptacle, of a liquid supply for the receptacle, means for supplying heat, means for supplying the mixture of gases to the receptacle under pressure and passing the same in contact with the liquid so that one of said gases is absorbed, and steam formed, and means for utilizing the energy of the discharged gases and steam.

2. In an apparatus for absorbing a gas from a mixture of gases by means of a liquid, the combination with the reaction receptacle, of a liquid supply for the receptacle, means for supplying the mixture of gases under pressure to the receptacle and passing the same in contact with the liquid so that one of said gases is absorbed, and steam formed, a transformer of energy, and means for utilizing the energy of the discharged gases and steam in the transformer of energy.

3. In an apparatus for absorbing a gas from a mixture of gases by means of a liquid, the combination with the reaction receptacle, of a liquid supply for the receptacle, a compressor for supplying the mixture of gases under pressure to the receptacle and passing the same in contact with the liquid, so that one of said gases is absorbed and steam formed, a transformer of energy connected to the compressor, and means for utilizing the energy of the discharged gases and steam in the transformer of energy.

4. In an apparatus for absorbing a gas from a mixture of gases by means of heated liquids, the combination with a reaction receptacle, of a steam supply for said receptacle, a liquid supply for the receptacle, and a compressor for compressing a gaseous mixture and supplying the same to the reaction receptacle, of a connection between the reaction receptacle, and the driving cylinder of said compressor whereby the gaseous mixture discharged from the reaction receptacle after giving off part of its components and being saturated with steam is used to drive the compressor.

5. In an apparatus for absorbing a gas from a mixture of gases, the combination with a reaction receptacle, adapted to receive the absorbing material, of a compressor for supplying the mixture of gases under pressure to the receptacle and passing the same in contact with the absorbing material so that one of said gases is absorbed, a pressure engine connected to said compressor and means for utilizing the energy of the discharged gases in said pressure engine.

6. The herein described process of absorbing a gas from a mixture of gases, which consists in compressing the mixture of gases, passing the mixture under pressure in contact with an absorbing material so that one of said gases is absorbed, and utilizing the energy of the discharged gases of said mixture in a transformer of energy which drives the compressor.

7. The herein described process of absorbing a gas from a mixture of gases by means of a liquid, which consists in heating the liquid, compressing the mixture of gases, passing the mixture under pressure in contact with the absorbing liquid so that one of said gases is absorbed and steam formed, and utilizing the energy of the discharged gases and steam in a pressure engine which drives the compressor.

In testimony whereof we have signed our names to this specification in the presence of two subscribing witnesses.

JULIUS WEISE.
FRIEDRICH RIECHE.

Witnesses for both applicants:
HERMAN PLISCHSA,
MAX DIESCHE.